United States Patent
Milana et al.

(10) Patent No.: US 8,677,129 B2
(45) Date of Patent: Mar. 18, 2014

(54) CONSUMER-DRIVEN SECURE SOCKETS LAYER MODULATOR

(75) Inventors: Joseph P. Milana, San Diego, CA (US); Stuart L. Crawford, Piedmont, CA (US)

(73) Assignee: Fair Isaac Corporation, San Jose, CA (US)

( * ) Notice: Subject to any disclaimer, the term of this patent is extended or adjusted under 35 U.S.C. 154(b) by 1250 days.

(21) Appl. No.: 12/120,215

(22) Filed: May 13, 2008

(65) Prior Publication Data
US 2009/0287932 A1 Nov. 19, 2009

(51) Int. Cl.
*G06F 21/00* (2013.01)
(52) U.S. Cl.
USPC .......................................................... 713/175
(58) Field of Classification Search
USPC .......................................................... 713/175
See application file for complete search history.

(56) References Cited

U.S. PATENT DOCUMENTS

| | | | |
|---|---|---|---|
| 6,651,061 B2 * | 11/2003 | Unchida et al. | 1/1 |
| 6,829,711 B1 * | 12/2004 | Kwok et al. | 713/183 |
| 2002/0095607 A1 * | 7/2002 | Lin-Hendel | 713/201 |
| 2005/0203855 A1 * | 9/2005 | Malcolm | 705/64 |
| 2007/0291936 A1 * | 12/2007 | Milana et al. | 380/30 |

* cited by examiner

*Primary Examiner* — Hadi Armouche
*Assistant Examiner* — Dao Ho
(74) *Attorney, Agent, or Firm* — Mintz Levin Cohn Ferris Glovsky and Popeo, P.C.

(57) ABSTRACT

A software system and method for executing secure commercial transactions online is disclosed. A user's password is received to initiate secure socket layer (SSL) communications with a transaction site on a server. A web session associated with the SSL communications is encrypted by associating a domain name of the transaction site with its SSL public key. Then, the user's password is added to a hypertext markup language (HTML) header of a message within the web session. When added, the password is invisible to a hypothetical man-in-the-middle (MITM) attacker, who cannot read the encrypted message nor mimic the user. The MITM is thus unable to compromise the user's account as the MITM is unable to provide the correct password into any fraudulent message.

6 Claims, 2 Drawing Sheets

CONSUMER-DRIVEN SECURE SOCKETS LAYER MODULATOR

BACKGROUND

Many online commercial activities such as online banking and other financial transactions are vulnerable to "phishing" and other crimes such as Domain Name Service (DNS) poisoning and counterfeit or spoofed web addresses, by which a consumer is tricked into divulging to criminal entities personal information necessary to log onto the consumer's account. These crimes exploit a readily identifiable vulnerability in online security: the consumer cannot verify with whom they are communicating.

One solution is to provide users of Web browsers direct control over the security of messages sent over the Internet by enabling the user to directly specify the sole end-recipient capable of reading the message. This control can be provided through a software module running on the consumer's PC that ensures that messages sent to the user's intended recipient is encrypted with the public-key associated with that recipient. The verification of these public-keys is performed through a separate connection with a trusted Certification Authority.

While assuring that no other entity can read the messages sent by the user, such a system is vulnerable to a form of a Man-In-The-Middle (MITM) attack if being a MITM does not require actually reading the message sent by the user. Such could be the case if the MITM acts as a passive conduit for the user's messages but, because the recipient's (e.g. a bank's) replies are not likewise secured, the MITM can obtain access to the user's account during the duration of the user's session. The secure encryption of the user's outgoing message prevents the MITM from garnering independent access to the user's account without the user's notice, but such intersession vulnerability is significant, however narrow.

SUMMARY

This document describes a software system and method for Secure Socket Layer (SSL) communications between a user's client computer and a transaction site. According to one aspect, a client computer-based method for executing secure electronic transactions over a communications network includes the steps of receiving a user's password to initiate secure socket layer (SSL) communications with a transaction site on a server, verifying that a web session associated with the SSL communications is encrypted by associating a domain name of the transaction site with its SSL public key, and adding the user's password to a hypertext markup language (HTML) header of a message within the web session.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
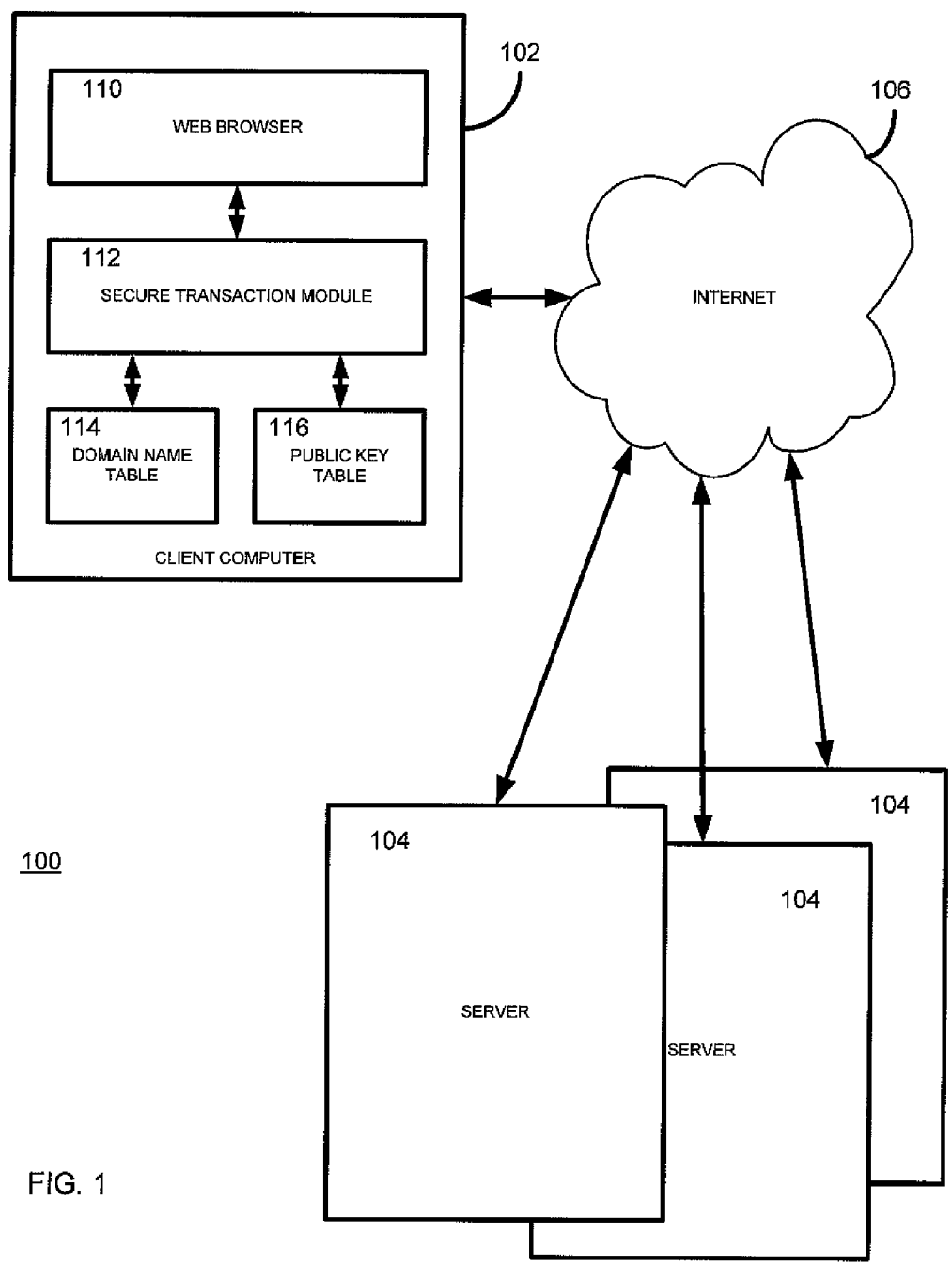
FIG. 1 is a network for performing secured commercial transactions.

As shown in FIG. 1, a security system 100 for online commercial transactions, in which requested commercial information is delivered to a client computer 102 from one or more servers 104, ensures that only an intended recipient can read the delivered information by leveraging existing e-commerce security infrastructure, such as the secure socket layer (SSL), but removing the anonymity of normal exchanges of a Web browser 110 of the client computer 102.

A secure transaction module 112, preferably a software program that is loaded on the client computer 102, provides an independent mechanism to verify any exchange against a consumer-specified allowed list of recipients of confidential information, while the SSL utilizes time-proven asymmetric cryptographic algorithms to secure the exchange of information. The secure transaction module 112 intercepts communications from the client computer 102 to the one or more servers 104, and verifies the communications by independently-derived look-ups to a domain name table 114 and public key table, to associate a web domain name with its SSL public key.

In one implementation, the secure transaction module 112 or other software program is configured to add the user's password into the Hypertext Markup Language (HTML) header, such as at the end of the URL_REFERER in the HTML header, for example. For parsing purposes by the recipient, the password is immediately preceded by a token that is unlikely to be contained within a password (e.g. "&&FairIsaac_ConsumerModulated_SecureSocketLayer_ID:"). The password is loaded into the software during the initialization process of a specified URL (e.g. the user's bank). Besides registering the URL, the user has the option of supplying their password.

When supplied, the password is added as described to the encrypted message and is thus invisible to any MITM attacker. As the MITM cannot read the encrypted message, the attacker is unable to mimic the user. The MITM is also unable to compromise the user's account as the MITM is unable to provide the correct password into the fraudulent message. In some implementations, where the password is lacking, the recipient has the option to prevent all further communication. Alternatively, the recipient may choose to limit the type of transactions to a restricted, less valuable subset (e.g., account inquiries rather than financial transfers).

Asymmetric algorithms invoke two encryption keys: a "public" key that is widely distributed, and a "private" key, known only by the one party (e.g. a bank or internet merchant) with whom each member of the public conducts business. A message encrypted by a given public key can only be decrypted by the owner of the associated private key. The encryption algorithms are publicly known, and their security, i.e. the inability to derive the secret private key from the public key, stems from invoking an unsolved problem in number theory to relate the two keys.

For example, RSA encryption, developed by Rivest, Shamir and Aldeman in 1977, and which has become the de-facto standard for Internet communications, is based upon the unsolved problem of efficiently (i.e. short of an exhaustive search) factorizing a large number into its component primes. More precisely, RSA encryption uses a large integer composed of two prime numbers. The present invention utilizes an infrastructure such as RSA encryption to ensure that all confidential information is encrypted using a public key associated with one of the consumer's pre-determined list of allowed recipients.

Figure 2:
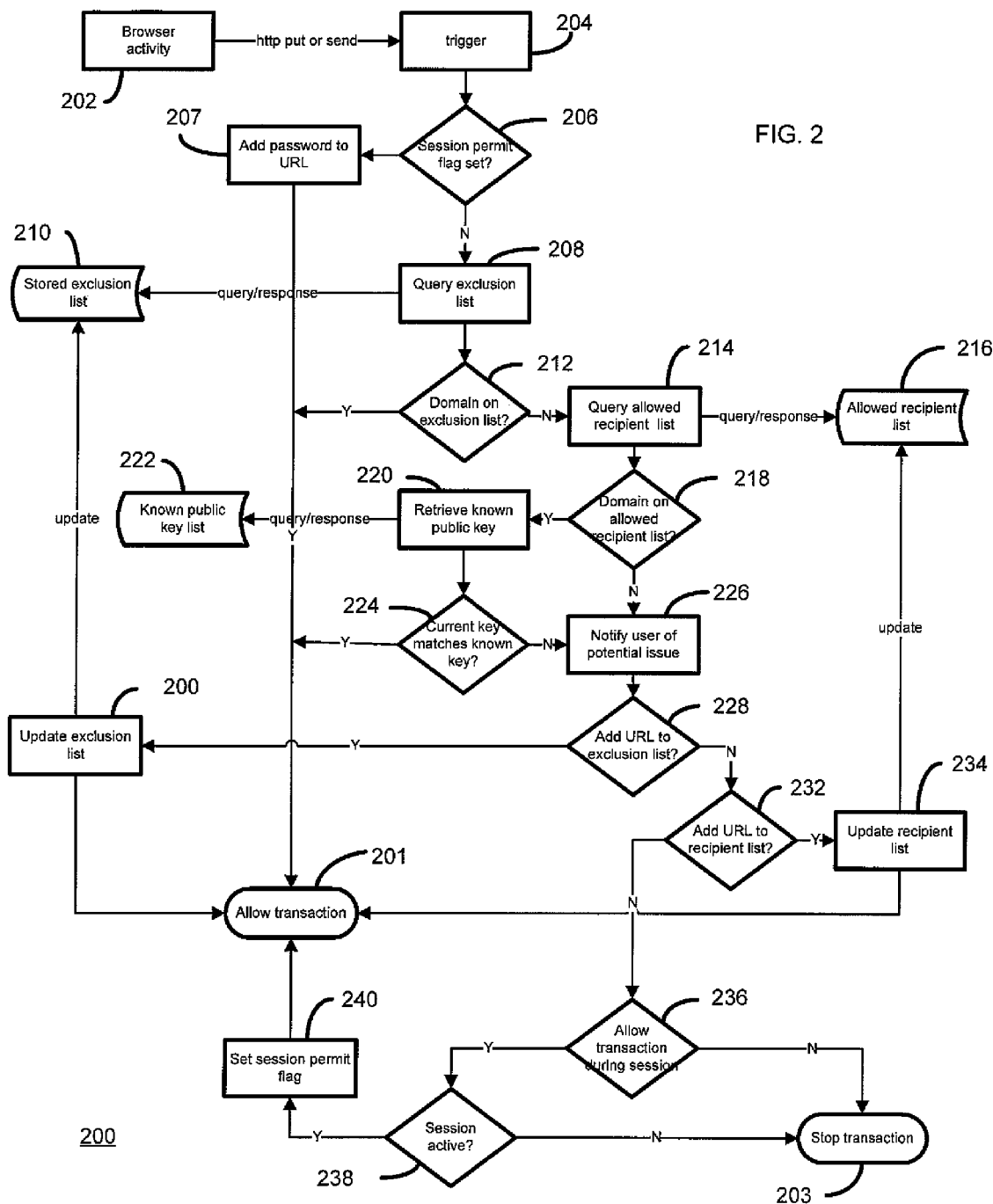
FIG. 2 is a functional flow diagram of a security system in accordance with an exemplary embodiment.

The system monitors all Hypertext Transfer Protocol (HTTP) Internet exchanges (i.e. messages transmitted typically through Transmission Control Protocol (TCP) ports 80 and 443). As shown in FIG. 2, at 202 all HTTP "POST" and "PUT" events (i.e., where the client computer is sending information) trigger a security look-up by the secure transaction module, at 204. At 206, a determination is made whether the session permits a flag to be set. If yes, at 207 the user's password is added into the HTML header of the message. For parsing purposes by the recipient, the password is immediately preceded by a token that is unlikely to be contained within a password. The password is loaded into the software during the initialization process of a specified URL (e.g. the user's bank). The transaction is allowed at 201. Next, at 208, an exclusion list (210) is queried. The secure transaction module requires that unless the recipient's domain name is on a pre-determined exclusion list, at 212, only POST and PUT transactions encrypted with a recognized public key are allowed, at 201.

If the domain is not on the exclusion list (210), the process continues and at 214 a query is made whether the domain is on an allowed recipient list (216). Verification is performed in several steps. First, at 218 the domain name of the intended recipient is compared against the pre-set, consumer specified list of allowed recipient domain names (216) for receiving confidential information. If the domain name of the present communication is not found, the secure transaction module intercepts and halts the communication, and at 226 a notification for a user is generated to inform the user of the issue. If the domain name is found, then the verification moves onto the next step.

Next, the public key of the present SSL communication (generated automatically by the Web browser) is retrieved at 220 from a known public key list (222), and compared against the known public key associated with the domain name. The public key of the present communication is obtained by examining a certificate transmitted by the domain, which is used by the browser to encrypt the outgoing POST or PUT. The correct public key of the domain is stored and updated by the software in a separate job that is run daily. If the POST or PUT is not encrypted, the outgoing message is halted.

The verification process assumes completion of several prior steps: First, an initialization stage is executed whereby the consumer provides a list 210 of all "approved" domain names to which to transmit confidential information (steps 232 and 234). These would typically include all bank sites with which the consumer has an account as well as any brokerage sites. This selection by the consumer would proceed by either finding their institution by name on a list provided by the software, or by explicitly entering the domain name of the desired site.

Also, the current public key associated with each domain on the consumer's list of approved sites must be maintained. As public keys typically have a one to two year lifetime, this maintenance will require the execution of a daily job that downloads current public keys from an Application Service Provider (ASP) hosting this service. The ASP maintains this list of public keys either through relationships with the major Certificate Authorities (e.g., Verisign, Equifax, etc.), or by independently visiting each site on the superlist of all (relevant) secure domains and examining the details of the transmitted Certificate.

The exclusion list include domains from which a consumer may frequently request information without requiring a secure channel, i.e. sites with which communication is allowed without any security check. These include the major search engines (Google, Yahoo, etc.), as well as other frequently-used resources such as freely accessed dictionaries (e.g. www.MiriamWebster.com) and encyclopedias (e.g. www.Wikipedia.org), as well as "search" queries at common e-commerce sites (e.g. www.Amazon.com). Many of these sites can be pre-loaded into the exclusion list. During the course of normal use, the consumer will have the option of adding new sites to their exclusion list, as described forthwith.

When an outgoing message is intercepted and halted by the module, the module will spawn a pop-up at 226 indicating to the consumer that communication is being attempted with an unsanctioned site. The consumer will then be given a number of options: 1) cease the attempted communication (203); 2) for the lifetime of the present session, allow all transmissions to this site (201); 3) add the site to the consumer's exclusion list (230), and allow transmission of the present message; and/or 4) add the site to the consumer's list 210 of sanctioned communication sites (228 and 230). This latter option requires the system to verify the public key of the added site as described above. The message is then processed according to the steps of comparing the public key of the present SSL communication with the known public key associated with the domain name, as described above.

In some embodiments, a warning message is augmented by an analysis of the domain name to determine if the site is attempting to spoof a legitimate banking site (e.g., www-.bankafamerica.com rather than www.bankofamerica.com). This analysis would utilize advanced text processing techniques, such as described in U.S. patent application Ser. No. 11/234,692, entitled, "Method and Apparatus for Automatic Entity Disambiguation" and assigned to Fair Isaac Corporation, the contents of which are incorporated by reference herein for all purposes. When such a spoof is deemed statistically likely, the warning message would indicate a heightened alert.

The system can be embodied in one or more software modules. Distribution channels for the software include direct-to-consumer downloads (from such consumer oriented sites as www.myFico.com) as well as through potential channel partners such as financial institutions and Internet Service Providers (ISPs).

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (DA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-based method comprising:
receiving, by a web browser of a client computer, a password of a user to initiate secure socket layer (SSL) communications with a transaction site on a server connected to the client computer via a communication network;
verifying, by a secure transaction module that is connected to the web browser and executed by the client computer, that a web session associated with the SSL communications is encrypted by determining that a domain name of the transaction site corresponds to a SSL public key, the domain name being obtained from a domain name table that is connected to the secure transaction module and executed by the client computer, the SSL public key being obtained from a public key table that is connected to the secure transaction module and executed by the client computer;
querying, by the secure transaction module, an exclusion list with the domain name of the transaction site to determine that a security of the transaction site needs verification and that the transaction site is not on the exclusion list, the verification being initiated by querying an allowed list with the domain name in order to determine whether the transaction site is allowed to continue the web session; and
adding, by the secure transaction module, the password at an end of a uniform resource locator (URL) referrer field of a hypertext markup language (HTML) header of a message before encrypting the message, the message being generated by the user within the web session to execute a secure electronic transaction via the communication network.

2. The method in accordance with claim 1, further comprising:
retrieving SSL public key for the transaction site from a known public key list when the transaction site is on the allowed list.

3. A method comprising:
initiating, by a client computer comprising one or more data processors, a web session of secure socket layer (SSL) communications with a transaction site on a server, the initiating comprising determining that a domain name of the transaction site is associated with a corresponding SSL public key to verify that the web session is encrypted, the domain name being one of a plurality of domain names stored in a domain name table within the client computer, the corresponding SSL public key being one of a plurality of public keys stored in a public key table within the client computer;
querying, by the secure transaction module, an exclusion list with the domain name of the transaction site to determine that a security of the transaction site needs verification and that the transaction site is not on the exclusion list, the verification being initiated by querying an allowed list with the domain name in order to determine whether the transaction site is allowed to continue the web session; and
adding, by a secure transaction module that is a part of the client computer and comprises one or more data processors, a password of a user at an end of a uniform resource locator (URL) referrer field of a hypertext markup language (HTML) header of a message before encrypting the message, the message being generated by the user within the web session to execute a secure electronic transaction between the client computer and the server computer.

4. The method in accordance with claim 3, wherein the header of the message designates the URL of the transaction site.

5. The method in accordance with claim 3, further comprising transmitting, by one or more data processors, the message with the password of the user in the HTML header to the transaction site.

6. A client-computer comprising:
a hardware processor invoking a web browser to receive a password of a user;
a domain name table comprising a plurality of domain names;
a public key table comprising a plurality of public keys; and
a secure transaction module invoked by the hardware processor, the secure transaction module connected to the web browser, the domain name table, and the public key table, the secure transaction module associating a domain name of the plurality of domain names that corresponds to a transaction site of a server computer with a public key of the plurality of public keys that corresponds to the transaction site, the secure transaction module associating the domain name with the public key to verify that a channel of communication between the secure transaction module and the server computer is secure, the secure transaction module adding the password to an end of a uniform resource locator (URL) field of a hypertext markup language (HTML) header of a message of the communication before encrypting the message, the secure transaction module sending the encrypted message to the server computer,
wherein the secure transaction module queries an exclusion list with the domain name of the transaction site to determine that a security of the transaction site needs verification and that the transaction site is not on the exclusion list, the verification being initiated by querying an allowed list with the domain name in order to determine whether the transaction site associated with the domain name is secure.

* * * * *